United States Patent
Bendix et al.

(10) Patent No.: US 6,852,821 B1
(45) Date of Patent: Feb. 8, 2005

(54) AQUEOUS PRIMARY DISPERSIONS AND COATING MATTERS, A METHOD FOR PRODUCING SAME AND THE USE THEREOF

(75) Inventors: Maximilian Bendix, Münster (DE); Wolfgang Bremser, Münster (DE); David Christie, Mannheim (DE)

(73) Assignee: BASF Coatings AG, Munster (DE)

( * ) Notice: Subject to any disclaimer, the term of this patent is extended or adjusted under 35 U.S.C. 154(b) by 146 days.

(21) Appl. No.: 10/148,427

(22) PCT Filed: Nov. 8, 2000

(86) PCT No.: PCT/EP00/11021

§ 371 (c)(1),
(2), (4) Date: May 29, 2002

(87) PCT Pub. No.: WO01/42311

PCT Pub. Date: Jun. 14, 2001

(30) Foreign Application Priority Data

Dec. 11, 1999 (DE) .......................... 199 59 927

(51) Int. Cl.$^7$ ...................... C08F 212/32; C09D 125/02
(52) U.S. Cl. .................... 526/347.1; 524/577; 524/578; 524/836
(58) Field of Search ..................... 524/543, 1

(56) References Cited

U.S. PATENT DOCUMENTS

| | | | |
|---|---|---|---|
| 3,552,986 A | 1/1971 | Bassemir ..................... 117/12 |
| 3,577,476 A | 5/1971 | Gurney ....................... 260/668 |
| 4,085,168 A | 4/1978 | Milkovich et al. .......... 260/886 |
| 4,533,701 A | 8/1985 | Kusumoto et al. .......... 525/370 |
| 4,656,226 A | 4/1987 | Hutchins et al. ............... 525/93 |
| 5,322,715 A | 6/1994 | Jouck et al. ................. 427/409 |
| 5,385,996 A | 1/1995 | Rizzardo et al. ............ 526/240 |
| 5,395,903 A | 3/1995 | Charmot et al. ............ 526/260 |
| 5,773,543 A | 6/1998 | Rizzardo et al. ............ 526/215 |
| 5,840,372 A | 11/1998 | Rink et al. ................. 427/407.1 |
| 5,854,353 A | 12/1998 | Knoll et al. ................. 525/314 |
| 5,857,998 A | 1/1999 | Barry .......................... 604/96 |
| 5,969,030 A | 10/1999 | Grandhee ................... 524/457 |
| 6,100,350 A | 8/2000 | Wilczek et al. ............... 526/82 |
| 6,162,886 A | 12/2000 | Bremer et al. .......... 526/318.42 |
| 6,235,857 B1 | 5/2001 | Rizzardo et al. ............ 526/220 |
| 6,346,591 B1 | 2/2002 | Ohrbom et al. ............. 526/312 |
| 6,403,709 B2 | 6/2002 | Ramesh et al. ............... 525/95 |
| 6,506,836 B1 | 1/2003 | Bremser et al. ............. 525/64 |
| 6,566,476 B2 | 5/2003 | Ohrbom et al. ............. 526/312 |
| 2002/0035289 A1 | 3/2002 | Walter et al. ............... 560/157 |
| 2002/0086966 A1 | 7/2002 | Weise et al. ................ 526/312 |
| 2002/0103319 A1 | 8/2002 | Ohrbom et al. ............. 526/312 |
| 2002/0132921 A1 | 9/2002 | Ramesh et al. ............... 525/88 |
| 2003/0078337 A1 | 4/2003 | Bremser et al. ............. 524/502 |
| 2003/0091832 A1 | 5/2003 | Ohrbom et al. .......... 428/423.1 |

FOREIGN PATENT DOCUMENTS

| | | | |
|---|---|---|---|
| CA | 2103595 | 1/1992 | ............. C08F/2/38 |
| CA | 2259559 | 7/1997 | ............. C08F/8/34 |
| CA | 2355620 | 6/2000 | ............. C08F/2/38 |
| DE | 35 46 594 | 12/1992 | ......... C08F/212/06 |
| EP | 358221 | 9/1989 | ............. C09D/5/44 |
| EP | 732359 | 3/1996 | ............. C08K/5/00 |
| EP | 755946 | 7/1996 | ............. C08F/2/22 |
| WO | WO9106535 | 5/1991 | ......... C07C/409/16 |
| WO | WO9222355 | 12/1992 | ............. A63B/37/12 |
| WO | WO9322351 | 11/1993 | ............. C08F/2/42 |
| WO | WO9910413 | 3/1999 | ............. C08J/3/00 |
| WO | WO9915597 | 4/1999 | ......... C09D/133/00 |
| WO | WO02/098932 | 12/2002 | ........... C08F/12/32 |

OTHER PUBLICATIONS

Derwent Accession No. 1996–094214, English Abstract for JP08003208.
Derwent Accession No. 1986–152526, English Abstract for Nippon, JP61085417.
Derwent Accession No. 1999–502399, English Abstract for JP11217409.
English Abstract from EPO for Dalibor, DE 3546594, filed Dec. 10, 1987.
English Abstract from EPO for Grutter, EP 358 221, filed Mar. 14, 1990.
English Abstract from EPO for Knoll, et al., EP 732 359, filed Sep. 18, 1996.
WO02/098932 was filed as US 10/476,636 on Oct. 30, 2003.

*Primary Examiner*—Kelechi C. Egwim

(57) ABSTRACT

Aqueous primary dispersions and coating materials comprising dispersed and/or emulsified, solid and/or liquid polymer particles and/or dispersed solid core-shell particles having a diameter $\leq 500$ nm preparable by controlled free-radical microemulsion or miniemulsion polymerization of A) at least one olefinically unsaturated monomer and B) at least one olefinically unsaturated monomer which is different than the olefinically unsaturated monomer (A) and has the general formula I: $R^1R^2C=CR^3R^4$ (I), in which the radicals $R^1$, $R^2$, $R^3$ and $R^4$ independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals; and also their use.

32 Claims, No Drawings

AQUEOUS PRIMARY DISPERSIONS AND COATING MATTERS, A METHOD FOR PRODUCING SAME AND THE USE THEREOF

This application is a National Phase Application of PCT/EP00/11021 filed on 8 Nov. 2000.

The present invention relates to novel aqueous primary dispersions and coating materials which comprise dispersed and/or emulsified, solid and/or liquid polymer particles and/or dispersed solid core-shell particles having a diameter $\leq 500$ nm. The present invention further relates to a novel process for preparing the novel aqueous primary dispersions and coating materials by means of controlled free-radical microemulsion and miniemulsion polymerization. The present invention relates, furthermore, to the use of the novel aqueous primary dispersions and coating materials for producing single-coat or multicoat clearcoat systems and single-coat or multicoat color and/or effect paint systems in automotive OEM finishing and refinishing, industrial coating, including container coating, coil coating and the coating of electrical components, and furniture coating.

The free-radical addition polymerization employed to prepare acrylate copolymers is frequently very exothermic and difficult to control. What this means for the reaction regime is that high concentrations of monomers and/or the so-called batch procedure, where the total amount of the monomers is introduced as initial charge in an aqueous medium, emulsified and subsequently polymerized to completion, must be avoided. In addition, the targeted establishment of defined molecular weights, molecular weight distributions and other properties often causes difficulties. The controlled establishment of a defined profile of properties in acrylate copolymers is, however, of great importance for their use as binders in coating materials, especially aqueous coating materials, since by this means it is possible to exert direct influence on the performance properties profile of the coating materials.

There has therefore been no lack of attempts to regulate the free-radical copolymerization of olefinically unsaturated monomers in a targeted way.

For instance, the international patent application WO 98/01478 describes a process in which the copolymerization is conducted in the presence of a free-radical initiator and of a thiocarbonylthio compound as chain transfer agent.

The international patent application WO 92/13903 describes a process for preparing copolymers of low molecular weight by free-radical chain polymerization in the presence of a group transfer agent having a carbon-sulfur double bond. These compounds act not only as chain transfer agents but also as growth regulators, and so result only in copolymers of low molecular weight.

The international patent application WO 96/15157 discloses a process for preparing copolymers having a comparatively narrow molecular weight distribution, in which a monomer is reacted with a vinyl-terminated macromonomer in the presence of a free-radical initiator.

Furthermore, the international patent application WO 98/37104 discloses the preparation of acrylate copolymers having defined molecular weights by free-radical polymerization in the presence of a chain transfer agent having a C—C double bond and having radicals which activate this double bond in respect of the free-radical addition of monomers.

Despite significant progress in this field, there continues to be a lack of a universally applicable process of controlled free-radical polymerization which yields chemically structured polymers, especially acrylate copolymers, in a simple manner and by means of which it is possible to tailor the profile of properties of the polymers in respect of their application in coating materials, especially aqueous coating materials, which are used to produce clearcoats and multicoat color and/or effect paint systems.

Microemulsions and miniemulsions are dispersions comprising water, an oil phase and one or more surface-active substances and having droplet sizes of from 5 to 50 nm (microemulsions) or from 50 to 500 nm. Microemulsions are regarded as being thermodynamically stable, whereas the miniemulsions are regarded as metastable (cf. Emulsion Polymerization and Emulsion Polymers, Editors: P. A. Lovell and Mohamed S. El-Aasser, John Wiley and Sons, Chichester, N.Y., Weinheim, 1997, pages 700 et seq.; Mohamed S. El-Aasser, Advances in Emulsion Polymerization and Latex Technology, 30th Annual Short Course, Volume 3, Jun. 7–11, 1999, Emulsion Polymers Institute, Lehigh University, Bethlehem, Pa., USA). Both types of dispersions find broad application in the art: for example, in cleaning products, cosmetics or bodycare products. They may, however, also be used for polymerization reactions in place of the customary macroemulsions, in which droplet sizes>1000 nm are present.

It would be desirable here to carry out the free-radical polymerization in microemulsion and mini-emulsion by the so-called batch procedure, where all of the monomers are charged to the reactor in an aqueous medium, emulsified and then polymerized to completion. This would make it possible to avoid from the outset the problems which result from the feed technique. These problems consist in particular in a comparatively high level of expenditure on measurement and control equipment and on apparatus, and in the fact that the monomers being fed in do not arrive at the site of polymerization but instead, as with macroemulsion polymerization, serve as a monomer reservoir for the initiated monomer droplets. As a result, these droplets change their composition continuously, which in the case of their subsequent initiation can lead to nonuniformity in the composition of the resultant polymer particles.

The preparation of aqueous primary dispersions by means of free-radical miniemulsion polymerization is known, for example, from the international patent application WO 98/02466 or from German patents DE-A-196 28 143 and DE-A-196 28 142. In the case of these known processes, the monomers may be copolymerized in the presence of different low molecular mass, oligomeric or polymeric, hydrophobic substances. Furthermore, hydrophobic, organic auxiliaries of low solubility in water, such as plasticizers, enhancers of the tackiness of the resulting film, film forming auxiliaries or other, unspecified organic additives, may be incorporated into the monomer droplets of the miniemulsion. The use of diphenylethylene as a comonomer and the use of the known aqueous primary dispersions for preparing coating materials are equally not evident from the abovementioned patents. Although the known processes solve the problem of the exothermic nature of the free-radical polymerization and copolymerization to a certain extent, they do so at the expense of an increased level of measurement and control equipment.

Aqueous coating materials based on aqueous primary dispersions which comprise solid core-shell particles and have been prepared by miniemulsion polymerization of monomers in the presence of hydrophobic polymers are known from the patents EP-A-0 401, 565, WO 97/49739 or EP-A-0 755 946. The use of a diphenylethylene comonomer is not disclosed by these patents.

It is an object of the present invention to find new aqueous primary dispersions and coating materials comprising dispersed and/or emulsified, solid and/or liquid polymer particles and/or dispersed solid core-shell particles having a diameter≦500 nm which no longer have the disadvantages of the prior art but instead can be prepared in a simple and controlled manner. The copolymers present in the new aqueous primary dispersions and coating materials ought to have defined molecular weights and ought to be preparable inter alia by the batch procedure without the occurrence in this case of the problems associated with the highly exothermic nature of the free-radical polymerization, ranging for instance from the thermal damaging of the products through to runaway of the reactor.

A further object of the present invention was to find a new process for preparing aqueous primary dispersions and coating materials by free-radical microemulsion or miniemulsion polymerization which no longer has the disadvantages of the prior art, but can instead be carried out by the batch procedure without the problems described above occurring, and which allows the profile of properties of the resulting copolymers to be adjusted in a targeted way, especially in terms of the molecular weight and molecular weight distribution.

Accordingly, we have found the novel aqueous primary dispersions and coating materials comprising dispersed and/or emulsified, solid and/or liquid polymer particles and/or dispersed solid core-shell particles having a diameter≦500 nm preparable by controlled free-radical microemulsion or miniemulsion polymerization of A) at least one olefinically unsaturated monomer and
B) at least one olefinically unsaturated monomer which is different than the olefinically unsaturated monomer (A) and has the general formula I $$R^1R^2C\!=\!CR^3R^4 \qquad (I)$$

in which the radicals $R^1$, $R^2$, $R^3$ and $R^4$ independently of one another are hydrogen atoms or substituted or unsubstituted alkyl, cycloalkyl, alkylcycloalkyl, cycloalkylalkyl, aryl, alkylaryl, cycloalkylaryl arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals, which are referred to below for short as "primary dispersions of the invention" and, respectively, "coating materials of the invention".

We have also found the novel process for preparing aqueous primary dispersions and coating materials comprising dispersed and/or emulsified, solid and/or liquid polymer particles and/or dispersed solid core-shell particles having a diameter≦500 nm by controlled free-radical microemulsion or miniemulsion polymerization of A) at least one olefinically unsaturated monomer and
B) at least one olefinically unsaturated monomer which is different than the olefinically unsaturated monomer (A) and has the general formula I $$R^1R^2C\!=\!CR^3R^4 \qquad (I)$$

in which the radicals $R^1$, $R^2$, $R^3$ and $R^4$ independently of one another are hydrogen atoms or substituted or unsubstituted alkyl, cycloalkyl, alkylcycloalkyl, cycloalkylalkyl, aryl, alkylaryl, cycloalkylaryl arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals, which is referred to for short below as "process of the invention".

Further subjects of the invention will emerge from the following description.

In the light of the prior art it was surprising and unforeseeable by the skilled worker that the object on which the present invention was based could be achieved through the primary dispersions of the invention and the coating materials of the invention and also through the process of the invention. In particular it was surprising that the copolymers present in the primary dispersions of the invention had properties which make them highly suitable for use in coating materials. It was also surprising that the primary dispersions of the invention can be used directly as physically curing coating materials. Not least was it surprising that the process of the invention yields the primary dispersions and coating materials of the invention in a particularly simple and targeted manner without the occurrence of the above-described problems known from the prior art.

For the purposes of the present invention, the property of being hydrophilic is understood as the constitutional property of a molecule or functional group to penetrate into the aqueous phase or to remain therein. Accordingly, for the purposes of the present invention, the property of being hydrophobic is understood as the constitutional property of a molecule or functional group to exhibit exophilic behavior with respect to water; i.e., they display the tendency not to penetrate into water, or to depart the aqueous phase. For further details reference is made to Römpp Lexikon Lacke und Druckfarben, Georg Thieme Verlag, Stuttgart, N.Y., 1998, "Hydrophilicity", "Hydrophobicity", pages 294 and 295.

In accordance with the invention, the primary dispersions and coating materials comprise dispersed and/or emulsified solid and/or liquid polymer particles and/or dispersed solid core-shell particles. The size of the polymer particles or of the dispersed core-shell particles is a direct result of the process of the invention described below. In this case the average particle diameter is less than 500 nm. It is preferably from 10 to 500 nm, more preferably from 50 to 400 nm, and with very particular preference from 100 to 350 nm. The primary dispersions and coating materials of the invention have an advantageously high solids content of, for example, more than 15% by weight, preferably more than 20% by weight. The primary dispersions and coating materials of the invention have a low viscosity, even at high solids content. It is even possible to obtain solids contents of more than 50% by weight, therefore, provided the particular primary dispersions of the invention do not become excessively viscous for an application.

The core-shell particles for use in accordance with the invention result from the graft copolymerization of organic solids and the comonomers (A) and (B) for use in accordance with the invention, described below. Said organic solids are preferably hydrophobic polymers, as described, for example, in the patents EP-A-0 401 565, page 3, line 5 to page 4, line 50, WO 97/49739, page 4, line 19 to page 5, line 3, or EP-A-0 755 946, page 3, line 26 to page 5, line 38. These hydrophobic polymers may also be prepared by the process of the invention.

The primary dispersions and coating materials of the invention may also have a bimodal particle size distribution in which from 0.1 to 80% by weight, in particular from 1.0 to 50% by weight, of the copolymer resulting from the comonomer (A) and (B) have a particle size, determined using an analytical ultracentrifuge, of from 20 to 500 nm, in particular from 50 to 300 nm, and from 20 to 99.9% by weight, in particular from 50 to 99% by weight, of the copolymer have a particle size of from 200 to 1500 nm, in particular from 300 to 900 nm, said particle sizes differing by at least 50 nm, in particular by at least 100 nm, with very particular preference by at least 200 nm. Concerning the measurement method, reference is made for further details to lines 5 to 9 of page 6 of the German patent application DE-A-196 28 142.

The first starting compound essential to the invention for the primary dispersions or coating materials of the invention, and for the process of the invention, is at least one olefinically unsaturated monomer (A).

Examples of suitable monomers (A) are a1) substantially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol (meth)acrylate or tert-butylcyclohexyl (meth)acrylate; (meth)acrylic oxaalkyl esters or oxacycloalkyl esters such as ethyltriglycol (meth)acrylate and methoxy-oligoglycol (meth)acrylate having a molecular weight Mn of preferably 550, or other ethoxylated and/or propoxylated hydroxyl-free (meth)acrylic acid derivatives. These may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indenedimethanol or 1,2-,1,3- or 1,4-cyclohexanediol; trimethylolpropane di- or tri(meth)acrylate; or pentaerythritol di-, tri- or tetra(meth)acrylate. For the purposes of the present invention, minor amounts of monomers of higher functionality in this case are to be understood as amounts which do not lead to crosslinking or gelling of the copolymers (A).

a2) Monomers which carry per molecule at least one hydroxyl, thio, amino, alkoxymethylamino, carbamate, allophanate or imino group, in particular a hydroxyl, amino or alkoxymethylamino group, and are substantially free from acid groups, such as hydroxyalkyl esters of acrylic acid, methacrylic acid or another alpha,beta-olefinically unsaturated carboxylic acid, which derive from an alkylene glycol esterified with the acid, or which are obtainable by reacting the alpha, beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as trimethylolpropane monoallyl or diallyl ether or pentaerythritol monoallyl, diallyl or triallyl ether (as far as these monomers (a2) of higher functionality are concerned, the comments made above relating to the monomers (a1) of higher functionality apply analogously); N,N-dimethyl-aminoethyl acrylate, N,N-diethylaminoethyl methacrylate, allylamine or N-methyliminoethyl acrylate or N,N-di(methoxymethyl)aminoethyl acrylate and methacrylate or N,N-di(butoxymethyl)aminopropyl acrylate and methacrylate;

a3) monomers which carry per molecule at least one acid group which can be converted into the corresponding acid anion group, such as acrylic acid, methacrylic acid, ethacrylic acid, crotonic acid, maleic acid, fumaric acid or itaconic acid; olefinically-unsaturated sulfonic or phosphonic acids or their partial esters; or mono(meth)acryloyloxyethyl maleate, succinate or phthalate. For the purposes of the present invention the monomers (a3) are not used as the sole monomers (A) but are always used in conjunction with other monomers (A) and, moreover, in amounts so small that the monomers (a3) do not polymerize outside the droplets of the miniemulsion.

a4) Vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (a4) may be prepared in conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, but especially Versatic® acids.

a5) Reaction products of acrylic acid and/or methacrylic acid with the glycidyl ester of an alpha-branched monocarboxylic acid having from 5 to 18 carbon atoms per molecule, in particular a Versatic® acid, or, instead of the reaction product, an equivalent amount of acrylic and/or methacrylic acid which is then reacted during or after the polymerization reaction with the glycidyl ester of an alpha-branched monocarboxylic acid having 5 to 18 carbon atoms per molecule, especially a Versatic® acid.

a6) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclopentadiene.

a7) (Meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclohexylmethyl- and/or N-methylol-, N,N-dimethylol-, N-methoxymethyl-, N,N-di(methoxymethyl)-, N-ethoxymethyl- and/or N,N-di(ethoxyethyl)-(meth)acrylamide;

a8) monomers containing epoxide groups, such as the glycidyl ester of acrylic acid, methacrylic acid, ethacrylic acid, crotonic acid, maleic acid, fumaric acid and/or itaconic acid.

a9) Vinylaromatic hydrocarbons such as styrene, alpha-alkylstyrenes, especially alpha-methylstyrene, and/or vinyltoluene; vinylbenzoic acid (all isomers), N,N-diethylaminostyrene (all isomers), alpha-methylvinylbenzoic acid (all isomers), N,N-diethylamino-alpha-methylstyrene (all isomers) and/or p-vinylbenzenesulfonic acid.

a10) Nitriles such as acrylonitrile and/or methacrylonitrile.

a11) Vinyl compounds, especially vinyl halides and/or vinylidene dihalides such as vinyl chloride, vinyl fluoride, vinylidene dichloride or vinylidene difluoride; N-vinylamides such as vinyl-N-methylformamide, N-vinylcaprolactam, 1-vinylimidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

a12) Allyl compounds, especially allyl ethers and allyl esters such as allyl methyl, ethyl, propyl or butyl ether or allyl acetate, propionate or butyrate.

a13) Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000 and, in particular, from 3000 to 7000 and having on average from 0.5 to 2.5, preferably from 0.5 to 1.5, ethylenically unsaturated double bonds per molecule, as are described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823 or in the international patent application WO 92/22615 on page 12, line 18 to page 18, line 10.

and/or a14) Acryloyloxysilane-containing vinyl monomers, preparable by reacting hydroxy-functional silanes with epichlorohydrin and then reacting the reaction product with (meth)acrylic acid and/or hydroxyalkyl and/or hydroxycycloalkyl esters of (meth)acrylic acid (cf. monomers a2).

Further examples of suitable monomers (A) are disclosed in the German patent application DE-A-196 28 142, page 2, line 50 to page 3, line 7.

Each of the abovementioned monomers (a1) to (a14), with the exception of the monomer (a3), can be polymerized alone with the monomers (B). In accordance with the invention, however, it is advantageous to use at least two monomers (A), since by this means it is possible to vary the profile of properties of the resulting copolymers very widely, in a particularly advantageous manner, and to tailor said profile of properties very targetedly to the particular intended use of the primary dispersions of the invention or of the coating materials of the invention.

It is also possible to use at least one monomer (A) comprising reactive functional groups which are able to enter into crosslinking reactions with the complementary reactive functional groups of crosslinking agents. Examples of suitable complementary reactive functional groups for use in accordance with the invention are collated in the overview below. In the overview, the variable R is an acyclic or cyclic aliphatic radical, an aromatic radical and/or an aromatic-aliphatic (araliphatic) radical; the variables R' and R" are identical or different aliphatic radicals or are linked to one another to form an aliphatic or heteroaliphatic ring.

Overview: Examples of Complementary Fuctional Groups
Monomer (A) and Crosslinking Agent (C)
or
Crosslinking Agent (C) and Monomer (A)

| | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR |
| —O—(CO)—NH$_2$ | —CH$_2$—OH |
| >NH | —CH$_2$—O—CH$_3$ |
| | —NH—C(O)—CH(—C(O)OR)$_2$ |
| | —NH—C(O)—CH(—C(O)OR) (—C(O)—R) |
| | —NH—C(O)—NR'R" |
| | =Si(OR)$_2$ |
| | 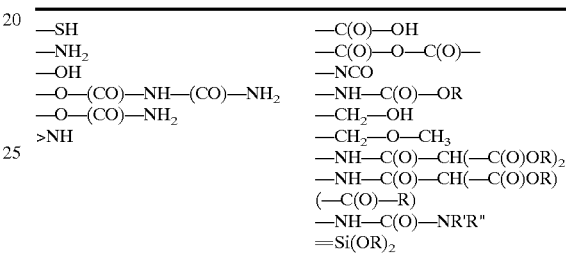 |
| —C(O)—OH | 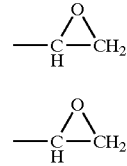 |

Examples of suitable monomers (A) of this kind are the above-described monomers (a2), (a3), (a7) and (a8).

The selection of the respective complementary groups is guided on the one hand by the consideration that, during the storage of primary dispersions or coating materials of the invention, these groups do not enter into any unwanted reactions and/or, if appropriate, do not inhibit or disrupt curing with actinic radiation, and on the other hand by the temperature range within which crosslinking is to take place.

In this case it is of advantage in accordance with the invention, especially with a view to heat-sensitive substrates such as plastics, to choose a temperature range which does not exceed 100° C., in particular 80° C. In the light of these boundary conditions, hydroxyl groups and isocyanate groups or carboxyl groups and epoxy groups have proven advantageous complementary functional groups, and so are employed with preference in accordance with the invention in the coating materials of the invention which are present in the form of two-component or multicomponent systems. As is known, this phrase refers to a coating material in which, in particular, the binder and the crosslinking agent are present separately from one another in at least two components which are not combined until shortly before application. Particular advantages result if the hydroxyl groups are used as functional groups in the copolymer formed from the monomers (A) and (B) and the isocyanate groups are used as functional groups in the crosslinking agent.

Where, on the other hand, crosslinking temperatures of from 100° C. to 180° C. can be employed, as is normally the case with one-component systems, where the binders and the crosslinking agents are present alongside one another, it is preferred to use monomers (A) containing thio, hydroxyl, alkoxymethylamino, alkoxymethylamido, imino, carbamate, allophanate and/or carboxyl groups, in particular amino, alkoxymethylamino or hydroxyl groups, especially hydroxyl groups, on the one hand, and crosslinking agents containing anhydride, carboxyl, epoxy, blocked isocyanate, urethane, methylol, methylol ether, siloxane, amino, hydroxyl and/or beta-hydroxyalkylamide groups, but especially blocked isocyanate, urethane or methylol ether groups, on the other.

Furthermore, alkoxymethylamino and alkoxymethylamido-containing monomers (A) are suitable for preparing self-crosslinking copolymers and primary dispersions and coating materials of the invention. As is known, the term "self-crosslinking" refers to the capacity of a binder (regarding the term, cf. Römpp Lexikon Lacke und Druckfarben, Georg Thieme Verlag, Stuttgart, N.Y., 1998, "binders", pages 73 and 74) to enter into crosslinking reactions with itself. For further details of this, refer to R ömpp Lexikon Lacke und Druckfarben, Georg Thieme Verlag, Stuttgart, N.Y., 1998, "curing", pages 274 to 276, especially page 275, bottom.

Preferably, the monomers (A) are selected so as to give (meth)acrylate copolymers whose profile of properties is determined primarily by the (meth)acrylates described above. In that case it is preferred as comonomer (A) to use vinylaromatic hydrocarbons (a9), especially styrene.

The monomers (A) are further selected so as to give copolymers whose profile of properties is determined primarily by above-described vinylaromatics (a9), especially styrene.

The second starting product, essential to the invention, for preparing the primary dispersions and coating materials of the invention and for the process of the invention is at least one olefinically unsaturated monomer (B) which is different than the above-described monomers (A).

The olefinically unsaturated monomer (B) for use in accordance with the invention has the general formula I.

$$R^1R^2C=CR^3R^4 \qquad (I)$$

In the general formula I, the radicals $R^1$, $R^2$, $R^3$ and $R^4$ independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl or 2-ethylhexyl.

Examples of suitable cycloalkyl radicals are cyclobutyl, cyclopentyl or cyclohexyl.

Examples of suitable alkylcycloalkyl radicals are methylenecyclohexane, ethylenecyclohexane or propane-1, 3-diylcyclohexane.

Examples of suitable cycloalkylalkyl radicals are 2-, 3- or 4-methyl-, -ethyl-, -propyl- or -butylcyclohex-1-yl.

Examples of suitable aryl radicals are phenyl, naphthyl or biphenylyl, preferably phenyl and naphthyl, and especially phenyl.

Examples of suitable alkylaryl radicals are benzyl or ethylene- or propane-1,3-diylbenzene.

Examples of suitable cycloalkylaryl radicals are 2-, 3- or 4-phenylcyclohex-1-yl.

Examples of suitable arylalkyl radicals are 2-, 3- or 4-methyl-, -ethyl-, -propyl- or -butylphen-1-yl.

Examples of suitable arylcycloalkyl radicals are 2-, 3- or 4-cyclohexylphen-1-yl.

The above-described radicals $R^1$, $R^2$, $R^3$ and $R^4$ may be substituted. For this purpose it is possible to use electron-withdrawing or electron-donating atoms or organic radicals.

Examples of suitable substituents are halogen atoms, especially chorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N-dicyclohexylamino, N-cyclohexyl-N-methylamino or N-ethyl-N-methylamino.

Examples of monomers (B) used with particular preference in accordance with the invention are diphenylethylene, dinaphthaleneethylene, cis- or transstilbene, vinylidenebis (4-N,N-dimethylaminobenzene), vinylidenebis(4-aminobenzene) or vinylidenebis(4-nitrobenzene).

In accordance with the invention, the monomers (B) may be used individually or as a mixture of at least two monomers (B)

The proportion of the monomers (B) in the monomer mixture (A) and (B), based in each case on the mixture, is preferably from 0.01 to 8.0%, more preferably from 0.1 to 7.0%, with particular preference from 0.15 to 6.0%, with very particular preference from 0.2 to 5.0%, and in particular from 0.25 to 4.0% by weight.

As regards the reaction regime and the properties of the resulting copolymers, especially the (meth)acrylate copolymers and the styrene copolymers, diphenylethylene is of very particular advantage and is therefore used with very particular preference in accordance with the invention.

The monomers (A) and (B) to be used in accordance with the invention are reacted with one another to form copolymers in the presence of at least one water-soluble and/or oil-soluble initiator which forms free radicals. Examples of initiators which can be used are: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, examples being azodinitriles such as azobisisobutyro-nitrile; C—C-cleaving initiators such as benzpinacol silyl ethers; or a combination of a nonoxidizing initiator with hydrogen peroxide. Further examples of suitable initiators are described in the German patent application DE-A-196 28 142, page 3, line 49 to page 4, line 6. Combinations of these initiators may also be used.

It is preferred to add comparatively large amounts of free-radical initiator, the proportion of the initiator in the reaction mixture being, based in each case on the overall amount of the monomers (a) and of the initiator, with particular preference from 0.2 to 20% by weight, with very particular preference from 0.5 to 15% by weight, and in particular from 1.0 to 10% by weight.

The weight ratio of initiator to the monomers (B) is preferably from 5:1 to 1:20.

The monomers (A) and (B) for use in accordance with the invention further are copolymerized in the presence of emulsifiers and/or protective colloids. Examples of suitable emulsifiers and/or protective colloids, and the amounts in which they are advantageously used, are disclosed in the German patent application DE-A-196 28 142, page 3, lines 8 to 48.

Advantageously, the copolymerization of the monomers (A) and (B) to be used in accordance with the invention is accompanied by hydrophobic compounds. These hydrophobic compounds are also referred to by those in the art as costabilizers.

The hydrophobic compounds comprise water-insoluble polymers, oligomers or substances of low molecular mass. Examples of suitable hydrophobic compounds are esters of alpha,beta-monoolefinically unsaturated carboxylic acids, having 3 to 6 carbon atoms, with alcohols having 12 to 30 carbon atoms in the alkyl radical; esters of vinyl alcohol and/or allyl alcohol with alkanemonocarboxylic, -sulfonic and/or -phosphonic acids having 12 to 30 carbon atoms in the molecule; amides of alpha,beta-monoolefinically unsaturated carboxylic acids having 3 to 6 carbon atoms with alkylamines having 12 to 30 carbon atoms in the alkyl radical; macromonomers based on olefinically unsaturated compounds having on average at least one olefinically unsaturated group, in particular at least one terminal olefinically unsaturated group, in the molecule; polysiloxane macromonomers having on average at least one olefinically unsaturated group, in particular at least one terminal olefinically unsaturated group, in the molecule; oligomeric and/or polymeric products of addition polymerization, polycondensation and/or polyaddition; water-insoluble molecular weight regulators, especially mercaptans; aliphatic, cycloaliphatic and/or aromatic halogenated and/or nonhalogenated hydrocarbons; alkanols and/or alkylamines having at least 12 carbon atoms in the alkyl radical; organosilanes and/or organosiloxanes; vegetable, animal, semisynthetic and/or synthetic oils; hydrophobic dyes. Further examples of suitable hydrophobic compounds, or costabilizers, and the amounts in which they are advantageously used, are disclosed in the German patent application DE-A-196 28 142, page 4, lines 37 to 59. Of these, hexadecane is particularly advantageous and is therefore used with particular preference in accordance with the invention.

In terms of the molecular weight distribution, the copolymer formed from the comonomers (A) and (B) is not subject to any restrictions whatsoever. Advantageously, however, the copolymerization is conducted so as to result in a molecular weight distribution Mw/Mn, measured by gel permeation chromatography using polystyrene as standard, of $\leq 12$, with particular preference $\leq 10$, and in particular $\leq 7$. The molecular weights of the constituents (A) are controllable within wide ranges by the choice of ratio of monomer (A) to monomer (B) to free-radical initiator. In this relationship, the amount of monomer (B) is a particular determinant of the molecular weight, specifically such that the higher the fraction of monomer (B) the lower the molecular weight obtained.

Suitable reactors for the copolymerization processes are the customary and known stirred vessels, cascades of stirred vessels, tube reactors, loop reactors or Taylor reactors, as described, for example, in the patents DE-B-1 071 241, EP-A-0 498 583 or in the article by K. Kataoka in Chemical Engineering Science, Volume 50, No. 9, 1995, pages 1409 to 1416. The free-radical copolymerization is preferably conducted in stirred vessels or Taylor reactors, the Taylor reactors being configured such that the conditions of Taylor flow are met over the entire length of the reactor, even if the kinematic viscosity of the reaction medium alters greatly—in particular, increases—as a result of the copolymerization.

In accordance with the invention, the copolymerization is conducted in an aqueous medium.

The aqueous medium contains essentially water. Besides emulsifiers and/or protective colloids and/or hydrophobic compounds, the aqueous medium may comprise customary and known additives and/or other dissolved solid, liquid or gaseous, organic and/or inorganic substances of low and/or high molecular mass, provided these do not adversely affect, let alone inhibit, the copolymerization. For the purposes of the present invention, the term "minor amount" means an amount which does not take away the aqueous nature of the aqueous medium.

Alternatively, the aqueous medium may simply consist of water.

The copolymerization is advantageously conducted at temperatures above room temperature, preference being given to the choice of a temperature range of from 30 to 95° C., with very particular preference from 50 to 90° C.

When using particularly volatile monomers (A) and/or (B) the copolymerization may also be conducted under pressure, preferably under from 1.5 to 3000 bar, with particular preference from 5 to 1500 and, in particular, from 10 to 1000 bar. In specific cases, temperatures higher than 95° C. may be used here.

It proves here to be a particular advantage of the process of the invention that it can also be conducted in batch mode. Otherwise, use may also be made of the regimes described in the German patent application DE-A-196 28 142, page 4, lines 6 to 36.

In accordance with the invention, the copolymerization is conducted in a microemulsion or miniemulsion, in particular a miniemulsion. In this case the average particle diameter of the emulsified monomer droplets is below 500 nm. It is preferably from 10 to 500 nm, more preferably from 50 to 400 nm, and with very particular preference from 100 to 350 nm. The particle diameter is the so-called z-average particle diameter, which is determined by means of photon correlation spectroscopy in accordance with the principle of dynamic, quasielastic light scattering. For this purpose use may be made, for example, of a Coulter N4 Plus Particle Analyzer from Coulter Scientific Instruments or a PCS Malvern Zetasizer 1000. The measurement is normally made on an aqueous emulsion containing 0.01% by weight of the emulsified monomer droplets. The aqueous emulsion further comprises, in the aqueous phase, the corresponding monomers in dissolved form (up to saturation), so that the emulsified monomer droplets do not break up.

The process of the invention may be performed so as to give the bimodal particle size distribution described above. Methods of producing bimodal particle size distributions are customary and known in the technological field in question here. It is preferred to use the seed method described in the German patent application DE-A-196 28 142, page 5, lines 31 to 49.

The preparation of the miniemulsion as part of the process of the invention has no particular features as to method, but instead takes place in accordance with the customary and known methods of dispersing or emulsifying in a high shear field. Examples of suitable methods are described in the patents DE-A-196 28 142, page 5, lines 1 to 30, DE-A-196 28 143, page 7, lines 30 to 58, or EP-A-0 401 565, [lacuna] lines 27 to 51.

An essential advantage of the primary dispersions of the invention is that they can be used per se as self-crosslinking or externally crosslinking, thermally curable or both thermally and actinically curable coating materials of the invention, preferably as surfacers, solid-color topcoat, aqueous basecoat and clearcoat materials, in particular as clearcoats. The coating materials of the invention may be one-, two- or multi-component systems. For these end uses, at least one customary and known crosslinker, additional binder and/or coatings additive in effective amounts may be added to the primary dispersions of the invention before, during and/or after their preparation. Before or during the preparation of the primary dispersions of the invention, the only additives added are those which do not disrupt, or even totally inhibit, the miniemulsion polymerization. The general technical knowledge of the skilled worker allows him or her to identify such additives. Preferably, said additives are added after the preparation of the primary dispersions of the invention.

Examples of suitable crosslinking agents are compounds or resins containing anhydride groups, compounds or resins containing epoxide groups, tris(alkoxycarbonylamino) triazines, compounds or resins containing carbonate groups, blocked and/or nonblocked polyisocyanates, beta-hydroxyalkylamides, and compounds containing on average at least two groups capable of transesterification, examples being reaction products of malonic diesters and polyisocyanates or of esters and partial esters of polyhydric alcohols of malonic acid with monoisocyanates, as described in the European patent EP-A-0 596 460.

Examples of suitable additional binders are oligomeric and polymeric, thermally curable, linear and/or branched poly(meth)acrylates or acrylate copolymers of block, comb and/or random structure, especially those described in the patent DE-A-197 36 535, polyesters, especially those described in the patents DE-A-40 09 858 or DE-A-44 37 535, alkyds, acrylated polyesters, polylactones, polycarbonates, polyethers, epoxy resin-amine adducts, (meth)acrylate diols, partially hydrolyzed polyvinyl esters, polyurethanes and acrylated polyurethanes, as described in the patents EP-A-0 521 928, EP-A-0 522 420, EP-A-0 522 419, EP-A-0 730 613 or DE-A-44 37 535, or polyureas.

Examples of suitable coatings additives are pigments, as described in Römpp Lexikon Lacke und Druckfarben, Georg Thieme Verlag, 1998, pages 176, "Effect pigments"; pages 380 and 381 "Metal oxide-mica pigments" to "Metal pigments"; pages 180 and 181, "Iron blue pigments" to "Black iron oxide"; pages 451 to 453, "Pigments" to "Pigment volume concentration"; page 563, "Thioindigo pigments"; and page 567, "Titanium dioxide pigments". These additives are used when the coating materials of the invention are used as surfacers, solid-color topcoats or aqueous basecoats, but in particular as aqueous basecoats in the context of the so-called wet-on-wet technique (cf., for example, European patent 0 089 497), to produce multicoat color and/or effect paint systems.

Further examples of suitable coatings additives are organic and inorganic fillers, thermally curable reactive diluents, low-boiling and/or high-boiling organic solvents ("long solvents"), UV absorbers, light stabilizers, free-radical scavengers, thermally labile free-radical initiators, crosslinking catalysts, devolatilizers, slip additives, polymerization inhibitors, defoamers, emulsifiers, wetting agents, adhesion promoters, leveling agents, film-forming auxiliaries, rheology control additives, or flame retardants. Further examples of suitable coatings additives are described in the textbook "Lackadditive" by Johan Bieleman, Wiley-VCH, Weinheim, N.Y., 1998.

If the coating materials of the invention are to be curable with actinic radiation as well (dual cure), they comprise additives curable with actinic radiation. Said actinic radiation may comprise electromagnetic radiation such as near infrared (NIR), visible light, UV light or X-rays, or corpuscular radiation such as electron beams. Examples of suitable additives curable with actinic radiation are known from German patent DE-C-197 09 467.

In terms of method, the application of the coating materials of the invention has no special features, but instead can be carried out by all customary application methods, such as spraying, knife coating, brushing, flow coating, dipping, trickle coating or roller coating, for example. It is preferred to use spray application methods, such as for example compressed air spraying, airless spraying, high-speed rotation, electrostatic spray application (ESTA), alone or in conjunction with hot spray application such as hot air spraying, for example.

Suitable coating substrates are all surfaces which are not damaged by curing of the coatings present on them with application of heat; examples include metals, plastics, wood, ceramic, stone, textile, fiber composites, leather, glass, glass fibers, glasswool and rockwool, mineral-bound and resin-bound building materials, such as plasterboards and cement slabs or roof shingles, and also assemblies of these materials. Accordingly, the coating material of the invention is also suitable for applications outside of automotive finishing, especially in the coating of furniture and in industrial coating, including coil coating, container coating and the impregnation or coating of electrical components. In the context of industrial coatings, it is suitable for coating virtually all parts for private or industrial use, such as radiators, domestic appliances, small metal parts such as nuts and bolts, hub caps, wheel rims, packaging, or electrical components such as motor windings or transformer windings.

In the case of electrically conductive substrates it is possible to use primers produced in a customary and known manner from electrodeposition (ED) coating materials. Suitable for this purpose are both anodic (AED) and cathodic (CED) electrodeposition coating materials, but especially CED. Unfunctionalized and/or apolar plastic surfaces can be subjected to conventional pretreatment before coating, such as with a plasma or by flaming, or may be provided with an aqueous primer.

The method of curing the applied coating materials also has no special features, but instead takes place in accordance with the customary and known thermal methods such as heating in a circulating air oven or irradiation with IR lamps, which in the case of dual cure may be supplemented by exposure to actinic radiation. In this context it is possible to use radiation sources such as high-pressure or low-pressure mercury vapor lamps, which may be doped with lead in order to open up a radiation window up to 405 nm, or electron beam sources.

The resultant coatings of the invention, especially the single-coat or multicoat color and/or effect paint systems and clearcoat systems of the invention, are easy to produce and have outstanding optical properties and very high chemical resistance and weathering stability. Accordingly, the substrates of the invention, comprising at least one coating of the invention, are of particularly high service value and have a particularly long service life, which makes them particularly attractive, economically and technically, for producers and users.

EXAMPLES

Example 1

The Preparation of a Primary Dispersion of the Invention and of a Coating Material of the Invention by the Process of the Invention 26.9 parts by weight of tert-butyl peroxyethylhexanoate (7.0% by weight, based on the monomers) were added to 384.9 parts by weight of a solution consisting of 26% by weight methyl methacrylate, 23% by weight styrene, 28% by weight hydroxypropyl methacrylate, 16% by weight N-butyl methacrylate, 5.0% by weight stearyl acrylate and 2.0% by weight diphenylethylene. The resulting solution was admixed with 586.5 parts by weight of deionized water, containing 1.593 parts by weight of sodium dodecyl sulfate (Texapon® 1296 from Henkel, 0.4% by weight, based on the monomers) and dispersed for 40 seconds using an Ultraturrax. The resulting preemulsion was converted by 10-minute pressure release homogenization into a stable miniemulsion having a z-average particle size, measured by photon correlation spectroscopy (PCS Malvern Zetasizer 1000), of 150 nm. The miniemulsions were transferred to a suitable steel reactor and polymerized for 15 hours with stirring at a constant polymerization temperature of 80° C. From a comparison of the oil temperature (reactor heating medium) with the temperature of the reaction mixture, no exotherm was observable. The resultant primary dispersion of the invention had a solids content of 27.3% by weight (30 minutes, 130° C.), a pH of 3.1 and a z-average particle size of 207 nm.

The primary dispersion of the invention was knifecoated onto glass plates using a box-type coater so as to give a wet film thickness of 150 μm. After drying in a circulating air oven for 30 minutes, at 145° C., the films gave transparent, glossy clearcoats with a surface which was satisfactorily even.

Examples 2 to 7

The Preparation of Primary Dispersions 2 to 7 of the Invention by the Process of the Invention Preemulsions were prepared from the starting products collated in the overview in Table 1. In the case of Examples 2 to 4, the preemulsions were sonicated using an ultrasonic probe (Dr. Hiltscher, Model UP 400 S) at an output of 25% for five minutes and an output of 100% for a further 20 minutes. In the case of Examples 5 to 7, the preemulsions were emulsified as described in Example 1. The resulting miniemulsions of Examples 2 to 7 were drawn by suction, using vacuum, into 1 liter Büchi glass pressure vessels. The vessels were then injected alternately with 1.5 bar of nitrogen and evacuated again, this operation being repeated five times. The receivers, which were under a nitrogen pressure of 1.5 bar, were heated to an internal temperature of 85° C. and kept at this temperature with stirring until the end of the polymerization.

Table 1 gives an overview of the starting products used for the miniemulsions of Examples 2 to 7, the amounts in which they were used, and the properties of the primary dispersions 2 to 4 of the invention.

The primary dispersions 2 to 7 of the invention were stable to sedimentation for several weeks and were extremely suitable for the preparation of coating materials.

TABLE 1

Preparation of the primary dispersions 2 to 7 of the invention

| | Example | | | | | |
|---|---|---|---|---|---|---|
| | 2 | 3 | 4 | 5 | 6 | 7 |
| Miniemulsion: Composition (parts by weight): | | | | | | |
| Emulsifier 1 (50%)[a)] | 1.93 | 1.99 | 1.93 | 1.99 | 1.99 | 1.99 |
| Emulsifier 2 (40%)[b)] | 2.41 | 1.99 | 2.41 | 1.99 | 1.99 | 1.99 |
| Water | 405.54 | 228.16 | 230.76 | 230.76 | 230.76 | 230.76 |
| Methyl methacrylate | — | — | — | 26 | 26 | 26 |
| n-Butyl methacrylate | — | — | — | 21 | 21 | 21 |
| Styrene | 96.34 | 99.62 | 96.33 | 20 | 23.5 | 22 |
| Hydroxypropyl methacrylate | — | — | — | 28 | 28 | 28 |
| Diphenylethylene | 3.66 | 0.38 | 3.66 | 0.5 | 1.5 | 3.0 |
| Hexadecane | 1.93 | 1.99 | 1.93 | 1.93 | 1.93 | 1.93 |
| Benzoyl peroxide (75%) | 0.31 | 0.32 | 0.31 | — | — | — |
| tert-Butyl peroxy-ethylhexanoate (100%) | — | — | — | 5.0 | 5.0 | 5.0 |
| Monomer content (% by weight) | 19.78 | 30.47 | 30.23 | 30.23 | 30.23 | 30.23 |
| Polymerization: | | | | | | |
| Polymerization time (h) | 8 | 8 | 8 | 8 | 8 | 8 |
| Polymerization temperature (° C.) | 85 | 85 | 85 | 85 | 85 | 85 |
| Primary dispersion: | | | | | | |
| Particle diameter (nm) | 214 | 199 | 220 | — | — | — |
| pH | 3.7 | 4.2 | 3.8 | — | — | — |
| Copolymer: | | | | | | |
| Number-average | 8224 | 50670 | 7671 | — | — | — |

TABLE 1-continued

Preparation of the primary dispersions 2 to 7 of the invention

| | Example | | | | | |
|---|---|---|---|---|---|---|
| | 2 | 3 | 4 | 5 | 6 | 7 |
| molecular weight Mn[c)] (daltons) | | | | | | |
| Mass-average molecular weight Mw[c)] (daltons) | 24020 | 96370 | 17010 | — | — | — |
| Polydispersity Mw/Mn | 2.9 | 3.7 | 2.8 | — | — | — |
| Glass transition temperature (theoretical by Fox) (° C.) | 100 | 100 | 100 | 74.55 | 74.55 | 74.55 |
| Hydroxyl number (mg KOH/g) | — | — | — | 109 | 109 | 109 |

[a)]Luminten ® I-RA from BASF Aktiengesellschaft;
[b)]Emulgator K30 from Bayer AG;
[c)]measured by gel permeation chromatography using polystyrene as internal standard;

Overall it was found that in the presence of diphenylethylene the miniemulsion polymerization could be conducted without problems in the batch mode.

What is claimed is:

1. An aqueous composition comprising a polymer having a diameter≦500 nm comprising a controlled free-radical microemulsion or miniemulsion polymerization product of
   A) at least one olefinically unsaturated monomer and
   B) at least one olefinically unsaturated monomer that is different than the olefinically unsaturated monomer (A) and has the general formula I

   $$R^1R^2C=CR^3R^4 \qquad (I)$$

wherein $R^1$, $R^2$, $R^3$, and $R^4$ are each independently one of a hydrogen atom, an unsubstituted alkyl radical, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl radical, an unsubstituted arylalkyl radical, an unsubstituted arylcycloalkyl radical, a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl radical, a substituted arylalkyl radical, and a substituted arylcycloalkyl radical, with the proviso that at least two of $R^1$, $R^2$, $R^3$, and $R^4$ are at least one of an unsubstituted aryl radical, an unsubstituted arylalkyl radical, an unsubstituted arylcycloalkyl radical, a substituted aryl radical, a substituted arylalkyl radical, and a substituted arylcycloalkyl radical;
   wherein the aqueous composition is one of a primary dispersion and a coating material, and wherein the polymer is at least one of a dispersed solid polymer particle, an emulsified solid polymer particle, a dispersed liquid polymer particle, an emulsified liquid polymer particle, and a dispersed solid core-shell particle.

2. The aqueous composition of claim 1, wherein the aryl radical is one of a phenyl radical and a naphthyl radical.

3. The aqueous composition of claim 1, wherein the substituent in at least one of $R^1$, $R^2$, $R^3$, and $R^4$ is one of an electron-withdrawing atom, an electron-donating atom, and an organic radicals.

4. The aqueous composition of claim 3, wherein the substituent is at least one of a halogen atom, a nitrile, a nitro group, an at least partially halogenated alkyl radical, an at least partially halogenated cycloalkyl radical, an at least partially halogenated alkylcycloalkyl radical, an at least partially halogenated cycloalkylalkyl radical, an at least partially halogenated aryl radical, an at least partially halogenated alkylaryl radical, an at least partially halogenated cycloalkylaryl radical, an at least partially halogenated arylalkyl radical, and an at least partially halogenated arylcycloalkyl radical, an aryloxy radical, a alkyloxy radical, and a cycloalkyloxy radical, an arylthio radical, alkylthio radical, a cycloalkylthio radical, a primary amino group, a secondary amino group, and a tertiary amino group.

5. The aqueous composition of claim 1, wherein the monomers (A) and (B) are copolymerized in the presence of at least one of an emulsifier and a protective colloid.

6. The aqueous composition of claim 1, wherein the monomers (A) and (B) are copolymerized in the presence of at least one hydrophobic compound.

7. The aqueous composition of claim 6, wherein the hydrophobic compound is water-insoluble and is one of a polymer, an oligomer, and a substances of low molecular mass.

8. The aqueous composition of claim 7, wherein the hydrophobic compound is at least one of:
   i) an ester of an α,β-monoolefinically unsaturated carboxylic acid, having 3 to 6 carbon atoms, with an alcohol having 12 to 30 carbon atoms in the alkyl radical;
   ii) an ester of a) at least one of a vinyl alcohol and an allyl alcohol with b) at least one of an alkanemonocarboxylic acid, an alkanemonosulfonic acid, and an alkanemonophosphonic acid having 12 to 30 carbon atoms in the molecule;
   iii) an amide of an α,β-monoolefinically unsaturated carboxylic acid having 3 to 6 carbon atoms with an alkylamine having 12 to 30 carbon atoms in the alkyl radical;
   iv) a macromonomer comprising an olefinically unsaturated compound having on average at least one olefinically unsaturated group in the molecule;
   v) a polysiloxane macromonomer having on average at least one olefinically unsaturated group in the molecule;

vi) at least one of an oligomeric reaction product and a polymeric reaction product of at least one of addition polymerization, polycondensation, and polyaddition;

vii) a water-insoluble molecular weight regulator;

viii) at least one of an alkanol and an alkylamine having at least 12 carbon atoms in the alkyl radical;

ix) at least one of an organosilane and an organosiloxane;

x) at least one of a vegetable oil, an animal oil, a semisynthetic oil, and a synthetic oil; and xi) a hydrophobic dye.

9. The aqueous composition of claim 8, wherein the hydrophobic compound is hexadecane.

10. The aqueous composition of claim 1, wherein monomer (A) is at least one of:

a1) a (meth)acrylic ester;

a2) a monomer that carries per molecule at least one hydroxyl group;

a3) a monomer that carries per molecule at least one acid group that can be converted into a corresponding acid anion group;

a4) a vinyl ester of an alpha-branched monocarboxylic acid having 5 to 18 carbon atoms in the molecule;

a5) a reaction product of a (meth)acrylic acid with a glycidyl ester of an alpha-branched monocarboxylic acid having from 5 to 18 carbon atoms per molecule;

a6) at least one of a cyclic olefin and an acyclic olefin;

a7) a (meth)acrylamide;

a8) a monomer containing at least one epoxide group;

a9) a vinylaromatic hydrocarbon;

a10) a nitrile;

a11) a vinyl compound;

a12) an allyl compound;

a13) a polysiloxane macromonomer having a number-average molecular weight Mn of from 1,000 to 40,000 and containing on average from 0.5 to 2.5 ethylenically unsaturated double bonds per molecule; and a14) an acryloyloxysilane-containing vinyl monomer comprising a reaction product of a material and at least one of methacrylic acid and a hydroxyalkyl ester of (meth)acrylic acid, wherein the material comprises a reaction product of a hydroxy-functional silane and epichlorohydrin;

with the proviso that the monomer (a3) is not used as the sole monomer (A).

11. The aqueous composition of claim 1, wherein the controlled free-radical microemulsion or miniemulsion polymerization is initiated by an initiator that forms free radicals and is at least one of water-soluble and oil-soluble.

12. The aqueous composition of claim 1, wherein the dispersed core-shell particles comprise cores of organic solids and shells of polymers that contain in copolymerized form at least one monomer (A) and at least one monomer (B).

13. The aqueous primary composition of claim 1, wherein the cores of the core-shell particles are prepared by one of free-radical microemulsion polymerization and miniemulsion free-radical polymerization.

14. The aqueous composition of claim 1, wherein the composition further comprises at least one of a crosslinking agent, an additional binder, and a coatings additive.

15. The aqueous composition of claim 1, wherein the composition further comprises an additive that can be cured with actinic radiation.

16. A process for preparing the aqueous composition of claim 1, comprising controlled free-radical microemulsion or miniemulsion polymerizing monomer (A) and monomer (B).

17. The process of claim 16, wherein the aryl radical is one of a phenyl radical and a naphthyl radical.

18. The process of claim 16, wherein the substituent in at least one of $R^1$, $R^2$, $R^3$, and $R^4$ is one of an electron-withdrawing atom, an electron-donating atom, and an organic radicals.

19. The process of claim 18, wherein the substituent is at least one of a halogen atom, a nitrile, a nitro group, an at least partially halogenated alkyl radical, an at least partially halogenated cycloalkyl radical, an at least partially halogenated alkylcycloalkyl radical, an at least partially halogenated cycloalkylalkyl radical, an at least partially halogenated aryl radical, an at least partially halogenated alkylaryl radical, an at least partially halogenated cycloalkylaryl radical, an at least partially halogenated arylalkyl radical, and an at least partially halogenated arylcycloalkyl radical, an aryloxy radical, a alkyloxy radical, and a cycloalkyloxy radical, an arylthio radical, a alkylthio radical, a cycloalkylthio radical, a primary amino group, a secondary amino group, and a tertiary amino group.

20. The process of claim 16, wherein the monomers (A) and (B) are copolymerized in the presence of at least one of an emulsifier and a protective colloid.

21. The process of claim 16, wherein the monomers (A) and (B) are copolymerized in the presence of at least one hydrophobic compound.

22. The process of claim 21, wherein the hydrophobic compound is water-insoluble and is one of a polymer, an oligomer, and a substances of low molecular mass.

23. The process of claim 22, wherein the hydrophobic compound is at least one of:

i) an ester of an α,β-monoolefinically unsaturated carboxylic acid, having 3 to 6 carbon atoms, with an alcohol having 12 to 30 carbon atoms in the alkyl radical;

ii) an ester of a) at least one of a vinyl alcohol and an allyl alcohol with b) at least one of an alkanemonocarboxylic acid, an alkanemonosulfonic acid, and an alkanemonophosphonic acid having 12 to 30 carbon atoms in the molecule;

iii) an amide of an α,β-monoolefinically unsaturated carboxylic acid having 3 to 6 carbon atoms with an alkylamine having 12 to 30 carbon atoms in the alkyl radical;

iv) a macromonomer comprising an olefinically unsaturated compound having on average at least one olefinically unsaturated group in the molecule;

v) a polysiloxane macromonomer having on average at least one olefinically unsaturated group in the molecule;

vi) at least one of an oligomeric reaction product and a polymeric reaction product of at least one of addition polymerization, polycondensation, and polyaddition;

vii) a water-insoluble molecular weight regulator;

viii) at least one of an alkanol and an alkylamine having at least 12 carbon atoms in the alkyl radical;

ix) at least one of an organosilane and an organosiloxane;

x) at least one of a vegetable oil, an animal oil, a semisynthetic oil, and a synthetic oil; and xi) a hydrophobic dye.

24. The process of claim 23, wherein the hydrophobic compound is hexadecane.

25. The process of claim 16, wherein monomer (A) is at least one of:

a1) a (meth)acrylic ester;

a2) a monomer that carries per molecule at least one hydroxyl group;

a3) a monomer that carries per molecule at least one acid group that can be converted into a corresponding acid anion group;

a4) a vinyl ester of an alpha-branched monocarboxylic acid having 5 to 18 carbon atoms in the molecule;

a5) a reaction product of a (meth)acrylic acid with a glycidyl ester of an alpha-branched monocarboxylic acid having from 5 to 18 carbon atoms per molecule;

a6) at least one of a cyclic olefin and an acyclic olefin;

a7) a (meth)acrylamide;

a8) a monomer containing at least one epoxide group;

a9) a vinylaromatic hydrocarbon;

a10) a nitrile;

a11) a vinyl compound;

a12) an allyl compound;

a13) a polysiloxane macromonomer having a number-average molecular weight Mn of from 1,000 to 40,000 and containing on average from 0.5 to 2.5 ethylenically unsaturated double bonds per molecule; and a14) an acryloyloxysilane-containing vinyl monomer comprising a reaction product of a material and at least one of methacrylic acid and a hydroxyalkyl ester of (meth)acrylic acid, wherein the material comprises a reaction product of a hydroxy-functional silane and epichlorohydrin;

with the proviso that the monomer (a3) is not used as the sole monomer (A).

26. The process of claim 16, wherein the controlled free-radical microemulsion or miniemulsion polymerizing is initiated by an initiator that forms free radicals and is at least one of water-soluble and oil-soluble.

27. The process of claim 16, wherein the dispersed core-shell particles comprise cores of organic solids and shells of polymers that contain in copolymerized form at least one monomer (A) and at least one monomer (B).

28. The process of claim 16, wherein the cores of the core-shell particles are prepared by one of free-radical microemulsion polymerization and miniemulsion free-radical polymerization.

29. The process of claim 16 further comprising adding at least one of a crosslinking agent, an additional binder, a coatings additive, an additive that can be cured with actinic radiation.

30. The process of claim 16 further comprising applying the aqueous composition to a substrate to provide one of an automotive OEM finish, an automotive refinish, an industrial coating, a coil coating, a container coating, an electrical component coating, and a furniture coating.

31. The process of claim 16 further comprising forming at least one coat on a substrate from the aqueous composition, wherein the substrate is one of primed and unprimed, and wherein the coat is at least one of a clearcoat, a color paint system, an effect paint system, and a color and effect paint system.

32. The substrate formed by the process of claim 31.

* * * * *